June 20, 1961 N. S. MOST 2,989,700
PULSE AMPLITUDE MEASURING SYSTEM
Filed July 28, 1958

INVENTOR.
NORTON S. MOST
BY *Marvin Moody*
ATTORNEY
*Glenn H. Antrim*
AGENT

United States Patent Office 2,989,700
Patented June 20, 1961

2,989,700
PULSE AMPLITUDE MEASURING SYSTEM
Norton S. Most, Cedar Rapids, Iowa
Filed July 28, 1958, Ser. No. 751,241
3 Claims. (Cl. 324—103)

This invention relates to peak reading voltmeters and particularly to voltmeters that compare peak voltages of pulsed high-frequency signal with peak voltages of continuous-wave modulated high-frequency signal.

The voltage measuring system of this invention has been especially designed for use with a signal generator which develops pulses of high-frequency signal that is to be used in testing electronic equipment. The signal generator is to be calibrated so that the pulses that are applied to external circuits have an accurate predetermined amplitude. At extremely high frequencies, other presently known peak-reading pulse voltmeters cannot be accurately calibrated to provide accurate peak-voltage readings that are independent of changes in frequency and changes in values of component parts. The peak-reading voltmeter system described herein may be instantly calibrated against a continuous-wave signal that is readily measured by a dependable accurate voltage measuring device.

Accordingly, the present invention comprises a peak-reading pulse voltmeter, a reference thermistor bridge, a source of continuous-wave signal connected to the voltmeter and to the reference bridge, a chopper or circuit interrupter connected between the signal means and the voltmeter, and means for pulse-modulating the source of signal.

An object of the present invention is to provide a peak-reading pulse voltmeter that displays accurate voltage readings independent of frequency changes of applied signal within a wide range of high frequencies.

Another object is to provide a peak-reading pulse voltmeter that can be accurately calibrated against a continuous-wave voltage reference so that the peak reading of the voltmeter is independent of changes in component parts of the relatively complex pulse voltmeter.

Figure 1:
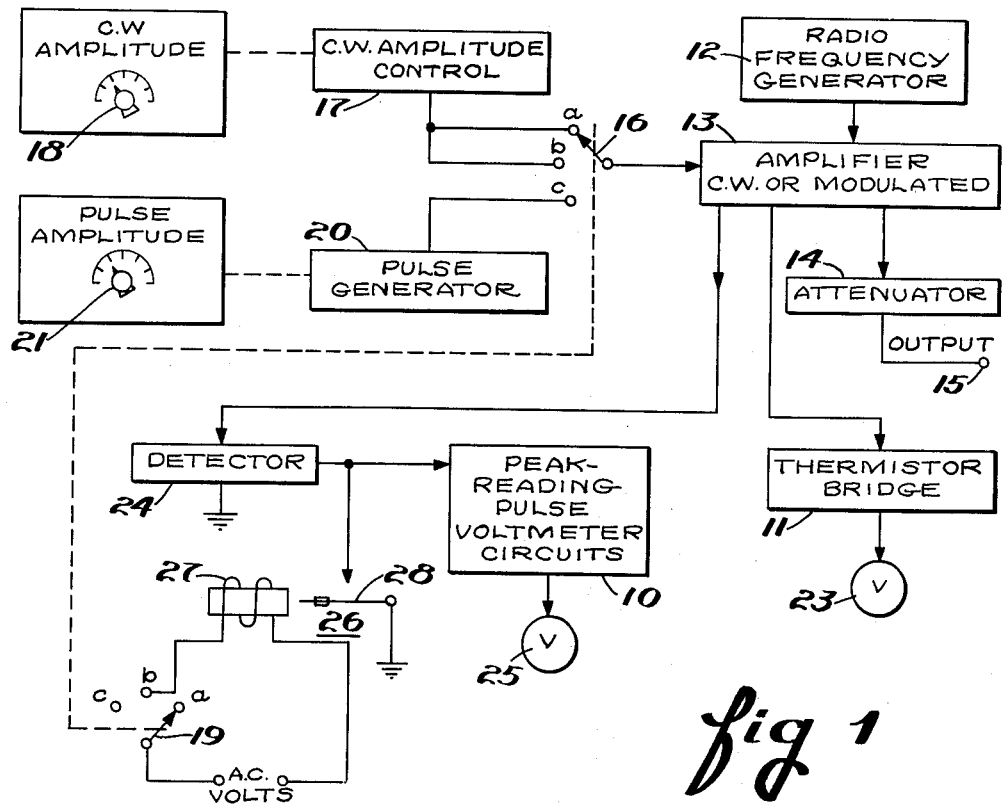
Figure 2:
Figure 2:
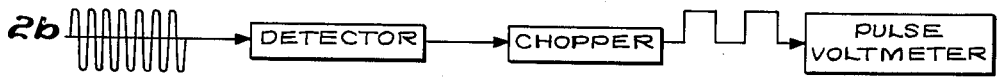
Figure 2:

The peak-reading pulse voltmeter of this invention may be more readily understood with reference to the accompanying drawings in which:

FIGURE 1 is a block diagram of the peak-reading voltage measuring system of this invention; and FIGURE 2 is a series of diagrams to show sequentially the operation of the peak-reading voltage measuring system.

The peak-reading pulse voltmeter 10 of FIGURE 1 may be of the type described in the article "An Automatic-Slideback Peak Voltmeter for Measuring Pulses" by Cyrus J. Creveling and Leonard Mautner published in the February 1947 issue of the Proceedings of the IRE. Voltmeters of this type measure pulse voltages over a wide range of repetition rates and display peak readings accurately quite independent of pulse widths. A combination of circuits described herein may be utilized for accurately measuring radio-frequency pulse amplitudes. In the present voltage measuring system the relatively simple dependable thermistor bridge 11 is used as a reference for accurately and instantly calibrating the peak-reading pulse voltmeter. The amplitude of a continuous-wave signal is measured by thermistor bridge 11. Also, this signal that has an amplitude as accurately indicated by bridge 11 is rectified, changed to a square wave by a chopper, and then measured by peak-reading pulse voltmeter 10. The signal that is being applied to the peak-reading pulse voltmeter and to the thermistor bridge 11 is then pulse modulated and applied directly to the peak-reading voltmeter 10. The maximum peak voltage that is contained within each pulse of the high-frequency signal is equal to the peak voltage of the continuous wave that was previously applied through the chopper to the voltmeter.

The radio frequency generator 12 is connected to amplifier 13 for applying test signal to an output circuit. The main output circuit of amplifier 13 is connected through calibrated attenuator 14 to output terminal 15. When the signal level of amplifier 13 has been set to a predetermined desired level, the amplitude of the signal that is applied to the output may be read directly from the calibrated attenuator 14.

In one application, amplifier 13 is designed to operate at a frequency of approximately 1,000 megacycles. In this particular application, the amplifier which may also be a frequency multiplier comprises a high frequency triode tube that is mounted within a tuned cavity. The output of radio frequency generator 12 is connected to the cathode of a triode tube that is contained within the amplifier, and the amplitude control circuits which are connected to switch 16 are connected to the anode of the triode. The arm 16 of a three-position switch section is ganged with arm 19 of another three-position switch section. When the arm 16 is in position a or b, the amplitude control circuit of amplifier 13 is connected to C.W. amplitude control 17 that is adjusted by amplitude control knob 18.

In the particular circuit that operates at approximately 1,000 megacycles, knob 18 is adjusted to vary the plate voltage on the triode that is contained within amplifier 13 and thereby to determine the amplitude of the continuous-wave signal that is present in the output circuit of the amplifier for application to output circuit 15. When switch arm 16 is in position c, the amplitude or modulation control circuit of amplifier 13 is connected to the output circuit of pulse generator 20. The amplitude of the modulating pulses that are developed by pulse generator 20 is controlled by pulse-amplitude control knob 21. When the pulse generator is connected through switch arm 16 to amplifier 13, the output of the amplifier is a pulse-modulated high-frequency signal.

When the amplifier 13 is supplying a continuous-wave signal, its output may be applied to the thermistor bridge 11 to be read on the meter 23 which is connected across the diagonal of the bridge. The thermistor bridge is a usual bridge circuit that has a thermistor bead in one arm of the bridge. In the circuit that operates at a frequency of approximately 1,000 megacycles, the thermistor bead of bridge 11 is mounted within the cavity of amplifier 13 so that the energy absorbed by the bead is proportional to the power developed by the amplifier. In accordance with a well known principle, the thermistor changes temperature in accordance with the power that is being absorbed so that the balance of the bridge is changed to cause a change in reading on meter 23. This thermistor bridge is a relatively simple circuit that operates substantially independent of frequency changes to provide a reliable signal-level reading.

The output of amplifier 13 is also connected through detector 24 to peak-reading pulse voltmeter 10 that has an output displayed on meter 25. In the specific example which operates at approximately 1,000 megacycles, detector 24 is a crystal diode that is mounted along with a pickup loop inside the cavity of amplifier 13. When switch arms 16 and 19 are in position b, the detector 24 develops a direct-current output in response to the application of a continuous-wave signal from amplifier 13. This continuous-wave signal is converted into a square wave by the operation of chopper 26. This chopper includes contacts 28 that are connected across the output of detector 24, and operating winding 27 that is connected through switch arm 19 to a source of alternating-current voltage. The alternating-current voltage is connected for causing operation of contacts 28 only when arm 19 is in position b. Since contacts 28 operate in synchronism with the frequency of the alternating-current voltage, the direct-current output of the detector is converted to a square wave that has a frequency corresponding to the frequency of the alternating-current voltage which operates the chopper.

The circuit of FIGURE 1 is operated in sequence as illustrated in FIGURE 2 in order to measure accurately the peaks of pulse-modulated signal that is provided by the amplifier 13. The ganged switch arms 16 and 19 are first operated to position a so that amplifier 13 operates to provide a continuous-wave signal at the desired frequency. The C.W. amplitude control 18 is adjusted until voltage reading on meter 23 corresponds to the peak voltage that is desired when the amplifier 13 is subsequently modulated to provide a pulse-modulated signal to output 15. Measurement of this voltage is represented in FIGURE 2a in that a continuous wave signal is applied directly to thermistor bridge 11.

After C.W. amplitude control 18 has been properly adjusted, the switching arms 16 and 19 are rotated to position b. The chopper is now operated by application of alternating-current voltage through switch arm 19 to convert the output of detector 24 into a square wave. As indicated in FIGURE 2b, a continuous-wave signal that has the same amplitude that was measured by thermistor bridge 11 is applied to the detector to develop a direct-current voltage. This direct-current voltage that has a value determined by the peak value of the continuous-wave signal is converted by the chopper to a pulsating voltage that may be a square wave and then is applied to peak-reading pulse voltmeter 10. The reading that is noted on meter 25 is the correct peak-voltage reading for a signal that has an amplitude that has been indicated on meter 23 which is connected to thermistor bridge 11.

Finally, the ganged switch arms 16 and 19 are rotated to position c. The chopper is now disabled and pulse generator 20 is connected for pulse-modulating amplifier 13. As shown in FIGURE 2c, the pulse-modulated signal from amplifier 13 is applied to detector 24. In the output of the detector, rectified pulses are developed for application to peak-reading voltmeter 10. The pulse amplitude control 21 is now adjusted until meter 25 displays that identical reading that was noted after C.W. amplitude control 18 was adjusted while switch arms 16 and 19 were in position b.

The peak-reading pulse measuring system of this invention is applicable to high-frequency circuits for accurately measuring peak voltages over a wide range of frequencies. The meters 23 and 25 as shown in FIGURE 1 may be replaced by a single meter that is connected to the thermistor bridge 11 while switch arms 16 and 19 are in position a and is connected to the pulse voltmeter circuit 10 while the switch arms are in positions b and c. The circuits may be modified for different applications and still be within the spirit and scope of the following claims:

What is claimed is:

1. A peak-reading pulse-voltage measuring system comprising, a peak-reading pulse voltmeter of the type for measuring accurately peak voltages independent of wide variations in frequency and pulse width, a chopper, a detector having an output connected to said chopper and the input of said peak-reading pulse voltmeter, a reference voltmeter for accurately reading the level of continuous-wave high-frequency signals, a source of continuous-wave high-frequency signal connected to said reference voltmeter, continuous-wave amplitude controlling means connected to said source for varying the amplitude of said continuous-wave high-frequency signal so that any desired reading can be displayed at will on said reference voltmeter in order to determine that said continuous-wave high-frequency signal has a certain peak voltage, means for applying said signal having a certain peak voltage to the input of said detector, means for operating said chopper so that the direct-current output voltage of said detector is converted into a pulsating voltage having a peak voltage determined by said certain peak voltage, said peak-reading pulse voltmeter responding to the application of said pulsating voltage to display a reading corresponding to said certain peak voltage, means for disabling said chopper so that the output of said detector is applied directly to the input of said peak-reading pulse voltmeter, pulse-modulating means connected to said source for pulse modulating said high-frequency signal, means for disabling said continuous-wave amplitude controlling means and for enabling said pulse-modulating means, means for varying the amplitude of said pulse-modulated high-frequency signal until said peak-reading pulse voltmeter displays a reading corresponding to the reading of said certain peak voltage to indicate that the peak voltage of said pulse-modulated high-frequency signal is equal to said certain peak voltage.

2. A peak-reading pulse-voltage measuring system comprising, a peak-reading pulse voltmeter of the type for measuring accurately peak voltages independent of wide variations in frequency and pulse width, a chopper, a detector having an output connected to said chopper and the input of said peak-reading pulse voltmeter, a thermistor bridge, a source of continuous-wave high-frequency signal connected to the input of said thermistor bridge, continuous-wave amplitude controlling means connected to said source for adjusting the amplitude of said continuous-wave high-frequency signal to read on said bridge a first voltage having a desired value, said source also applying said continuous-wave high-frequency signal of said first voltage to the input of said detector, means for operating said chopper to convert the output of said detector from direct-current voltage to square-wave voltage for application to the input of said peak-reading pulse voltmeter, said peak-reading pulse voltmeter displaying a reading for a second voltage, said second voltage being the peak ampltitude of that signal from said source while said source is adjusted to provide signal of said first voltage, means for disabling said chopper so that the output of said detector is applied directly to the input of said peak-reading pulse voltmeter, means for disabling said continuous-wave amplitude controlling means, pulse-modulating means connected to said source, said pulse-modulating means being enabled for pulse modulating said high-frequency signal, means for varying the peak amplitude of said pulse-modulated signal to provide a reading on said peak-reading pulse voltmeter that is identical to the reading provided by said second voltage whereby the peak voltage of said pulse-modulated high-frequency signal is equal to the peak voltage of said continuous-wave high-frequency signal when said source is adjusted as required to provide signal of said first voltage.

3. A peak-reading pulse-voltage measuring system comprising, a detector, a peak-reading pulse voltmeter of the type for measuring accurately peak voltages independent of wide variations in frequency and pulse width, a chopper, the output of said detector being connected to said chopper and the input of said peak-reading pulse voltmeter, means for applying a high-frequency continuous-wave signal with predetermined amplitude to the input of said detector, means for operating said chopper to convert the direct-current output voltage of said detector to a pulsating voltage for application to said pulse voltmeter, said pulse voltmeter responding to the application of said pulsating voltage for displaying a particular voltage reading that corresponds to the peak voltage of said signal, means for disabling said chopper so that the output voltage of said detector is applied directly to the input of said pulse voltmeter, means for removing said continuous-wave signal from the input of said detector and for applying a pulse modulated signal to the input of said detector, means for varying the amplitude of said pulse-modulated signal until said pulse voltmeter displays a reading corresponding to the peak voltage of said continuous-wave signal thereby to indicate that the peak voltage of said pulse-modulated signal is equal to the peak voltage of said continuous-wave signal that has a predetermined amplitude.

References Cited in the file of this patent

UNITED STATES PATENTS

| | | |
|---|---|---|
| 2,472,013 | Hansell | May 31, 1949 |
| 2,574,682 | Ancona | Nov. 13, 1951 |
| 2,843,824 | Whittier | July 15, 1958 |